United States Patent [19]

Adamson

[11] 3,986,415

[45] Oct. 19, 1976

[54] CAN TREATMENT TOOL

[76] Inventor: Alan Adamson, 28 Leaman Drive, Dartmouth, Nova Scotia, Canada

[22] Filed: Apr. 1, 1975

[21] Appl. No.: 564,072

[52] U.S. Cl. .................................... 82/47; 30/4 R; 30/8; 30/15.5

[51] Int. Cl.² .................................... B23B 1/00

[58] Field of Search ................ 82/47, 46; 30/4 R, 8, 30/15.5

[56] References Cited

UNITED STATES PATENTS

| | | | |
|---|---|---|---|
| 3,110,962 | 11/1963 | Krist et al. | 30/4 R |
| 3,161,952 | 12/1964 | Czapiewski | 30/4 R |
| 3,510,941 | 5/1970 | Fyfe | 30/15.5 |
| 3,667,120 | 6/1972 | Krist | 30/15.5 |
| 3,880,026 | 4/1975 | Adamson | 82/47 |

*Primary Examiner*—Leonidas Vlachos

[57] ABSTRACT

Inspection of can double seams is performed by cutter which approaches can in a relative direction and location to both sever the cover hook and move it along the can without damage to the body hook. The cutter is caused to move at a small angle away from the can during the cutting action to avoid damage to the body hook.

4 Claims, 6 Drawing Figures

CAN TREATMENT TOOL

This invention relates to a means for cutting the cover hook of a cylindrical can seam and can be considered as a type of rotary seam stripper.

Cans are formed with a seam at each end wherein the can wall material, at the end of the wall, extends outwardly therefrom and then back a short distance to form what is known as a body hook spaced from the wall of the can body sufficiently to receive the end of a hook formed by material of the can cover. The can cover at the end of the can under discussion was provided with a cover hook comprising an edge extending outwardly, over the outward extending portion of the cover hook, along the outside of the body hook, inward across the end of the body hook and between the body hook and the body. This seam is formed and crimped to provide a sealed can end closure, known as a "double seam".

It is standard procedure to provide one such closure for the can at the plant where the can is manufactured, and the other end closure is provided at the canning factory after the contents have been inserted.

For safety and quality control reasons, it is necessary to provide for inspection of a certain proportion of such seams by cutting and detaching the cover hook therefrom allowing measurement of the dimensions and thicknesses of the undetached portion of the seam and of the detached cover hook.

This invention provides means and a method for severing and separating a cover hook from a completed seam for inspection purposes. The invention was designed primarily for use in the can manufacturing plant, i.e. for inspecting the seam of the first formed can end closure. However, if desired, the invention may equally be used to perform the same operations on the second formed seam, formed in the canning factory.

This invention provides: means for holding the can, whose seam is to be inspected, with the seam exposed, a cutter, and means for moving the can along a locus relative to the cutter, with the can seam to be inspected leading in its motion measured relative to the cutter. The locus is selected and the cutter located so that the movement of the can along the locus severs the cover hook but does not sever and does not damage the body hook or the remainder of the seam. To ensure that damage to the body hook is avoided the cutter is mounted so that a guide surface may move the cutter outwardly relative to the can during the cutting action. The locus of relative movement, the cutter and the guide surface are designed so that the cutter severs the cover hook without damage to the body hook. The locus, cutter and guide surface are also designed so that the movement of the can relative to the cutter, during the cutting action is continued (with the position of said cutter controlled by said guide) a short distance past the point at which the cutter has severed the cover hook, and the resultant continued movement of the cutter relative to the can separates the severed portion of the cover hook from the seam to allow easy inspection of the seam and easy removal and inspection of the cover hook.

In drawings which illustrate a preferred embodiment:

The preferred embodiment of the invention utilizes a modified drill press. Such drill press is designed to support the can on platform 10 centred relative to the chuck 12 thereabove. In accord with the conventional design of such machines, pulling the lever toward the operator causes the platform 10 to rise, contacting the chuck and causing rotation of chuck, can, and holder as these members continue to rise while rotating the can under the continued movement of lever 14 toward the operator. A cutter 18 is located to sever the cover hook seam as the rotating can moves upwardly as described in connection with FIGS. 2–4.

Figure 1:
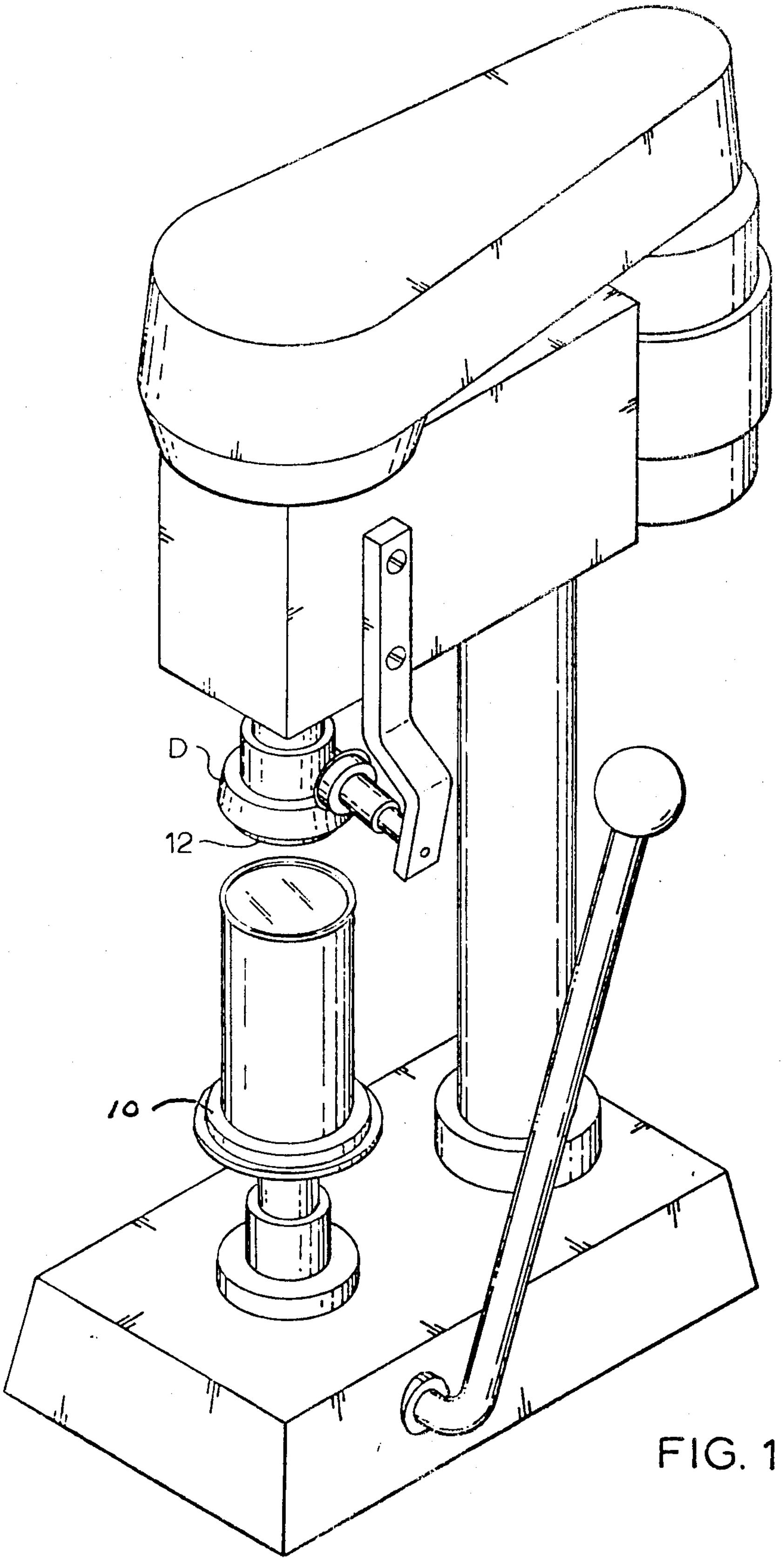
FIG. 1 is a perspective view of apparatus in accord with the invention.
Figure 2:
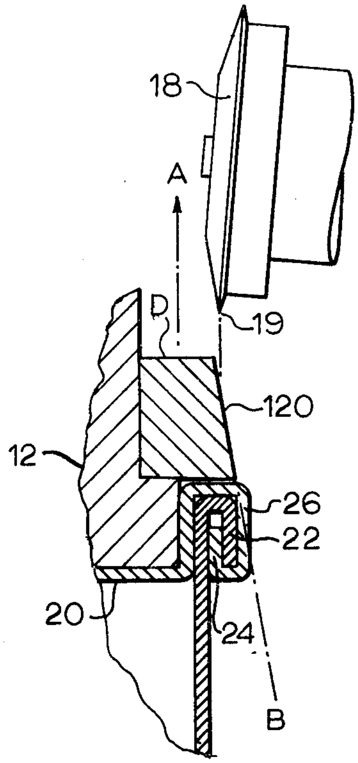
FIGS. 2, 3 and 4 are enlarged views of apparatus in accord with the invention.

As illustrated in FIG. 2, the can will be closed, in accord with normal closure techniques by a conventional double seam achieved by shaping the edge of the can lid 20 and the adjacent edge of the can wall so that, the edge of the can body extends outwardly then back, roughly parallel to the can body to form a body hook 22 spaced from the can body to receive the end of a cover hook 24 between the body hook 22 and the can body. The edge of the cover 20 extends a short distance upwardly along the inside of the can body outwardly, down the outside of the backwardly extending body hook, at 26 across the edge of the body hook and back to form a cover hook 24 between the body hook and the can wall. The seam, as described above, is formed and crimped in accord with standard and well known, can making techniques, and the intent is of course to enclose and properly seal the can.

Figure 3:
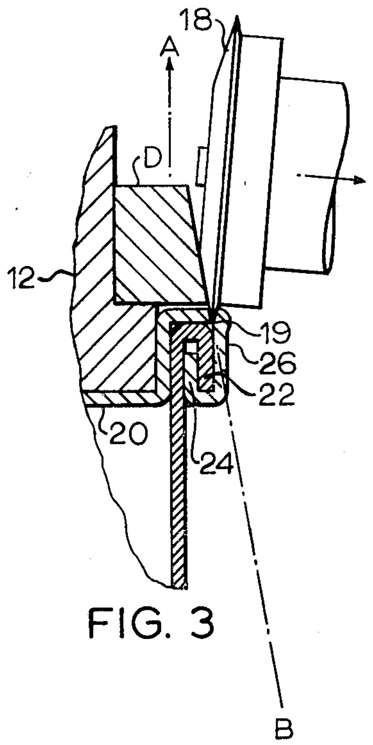
Figure 4:
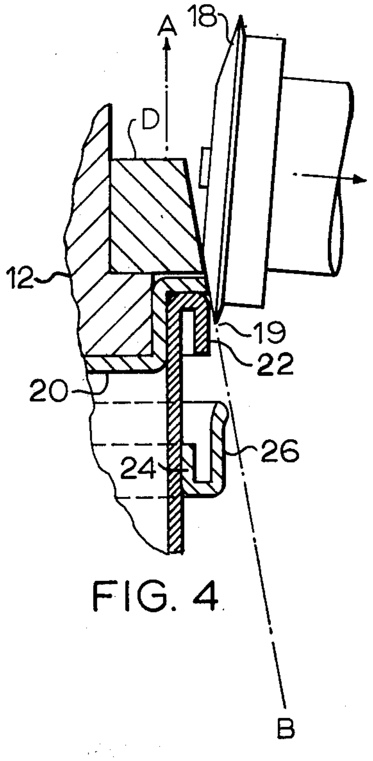
Figure 6:
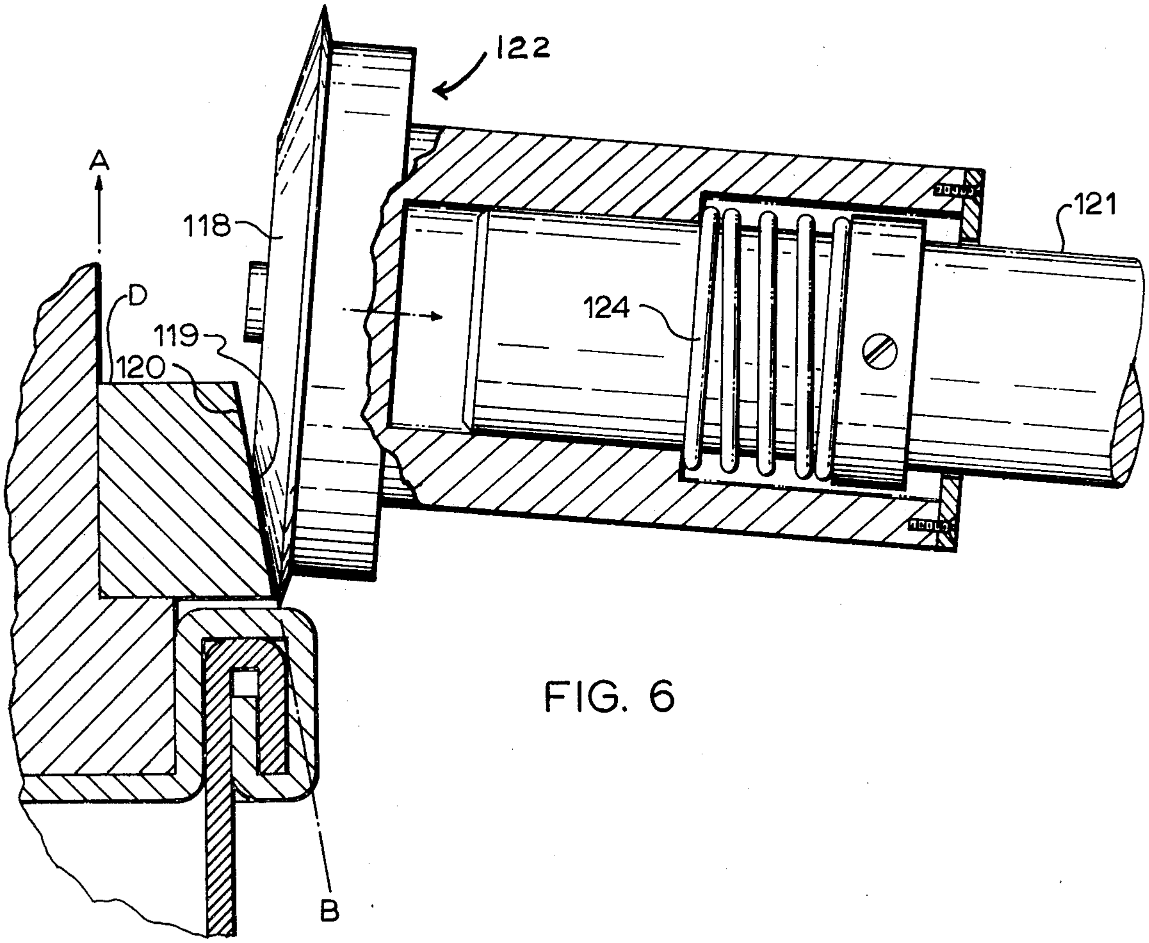
FIG. 6 shows the cutter and its mounting.
Figure 5:
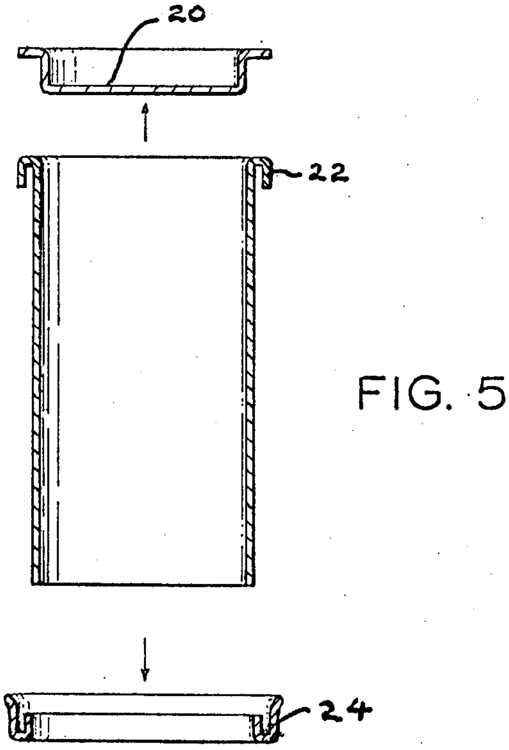
FIG. 5 shows a can after operation by the tool.

In accord with the invention, FIGS. 2, 3 and 4 disclose the desired path of movement of the cutter 18 to achieve severance and stripping of the cover hook 24 from the can cover and the seam.

As shown in FIGS. 2–6 the chuck 12 is provided with a guide ring D mounted on the chuck and provided with a outwardly facing surface 120 diverging downwardly and outwardly. The cutter 118 is shaped as shown in FIGS. 2–6 to have two surfaces converging to form the cutting edge, of which the outer surface 119 is shaped to be parallel to and to contact the surface 120 of ring D during the approach of the can to the cutter. The shaft 122 on which the cutter 118 is rotatably mounted, is constructed to be telescopically retractable, and biassed outwardly by spring 124. The cutter 118 is located so that prior to the arrival of the can in its upward movement, the cutter 118 rests with its face 119 bearing on parallel surface 120. When, in accord with the operation of the modified drill press, revolving can and platform 10 are raised, the cutter 118 located by surface 120 of ring D contacts the cover hook 24 at the location shown in FIG. 3. As the rotating can and holder 10 continue to rise, carrying with them now rotating chuck 12 and ring D the cutter is moved outwardly by the pressure of surface 120 on surface 119 and the movement of the edge of cutter 118 relative to the can is indicated by line B. The location of contact of the cutter edge with the can seam and the direction B therefrom is selected so that the cutter severs the cover hook and moves it along the can from the unsevered position while leaving the body hook undistorted.

The preferred angle of the cutting locus B to the approach locus A is about 80°.

FIG. 3 shows the cutter edge severing the cover hook 26 from the remainder of the cover member and the seam, during movement of the rotating can upwardly past the cutter. FIG. 4 shows an extent of travel which must be permitted in the design to carry the can further past the cutter 18, still moving along its locus of movement, resulting in the cutter edge moving the cover hook away from the seam.

When this has been done, the cover, now severed from the seam, may easily be removed as may the now annular cover hook. The remaining seam and the cover hook may then be measured and inspected.

Design of the cutter 18 and its support must be such that the cutter may move past its severance location to move the cover hook away from the seam.

The invention may be embodied and performed by alternative means, wherein means are provided to cause a can to rotate with its seam exposed at a given location and lever or other control to bring the cutter along a locus of movement A into contact with the seam for severance and displacement of the cover hook by movement along line B.

I claim:

1. Method of treating can seams for inspection thereof, wherein the can is of a type having a cylindrical wall terminating at least one end in a double seam comprising a body hook wherein the end of the material of the can wall is curved outwardly then backwardly along the can wall, and a cover hook wherein the edge of the cover is curved to extend along the outside of the body hook, inward across the end thereof, then in between the body hook and the can wall, comprising the steps of:

holding said can in a manner to leave said at least one end free for cutting, moving said can parallel to its cylindrical axis relatively toward a cutter, with the seam end advanced, along a locus of movement, until said cutter contacts said cover hook, during said movement rotating said can about it's longitudinal axis relative to said cutter, continuing said movement while guiding said cutter after contact with said cutter hook so that during the cutting of said cover hook, said cutter moves at a small angle outwardly from said relative path.

said guiding being performed to ensure that said cutter severs said cover hook without severing said body hook, and displaces said severed cover hook away from said seam.

2. A method of treating can seams for inspection thereof, wherein the can is of a type having a cylindrical wall, terminating at at least one end in a seam comprising a body hook, wherein the end of the material of the can wall is curved outwardly then backwardly along the can wall, and a cover hook wherein the edge of the cover is curved to extend along the outside of the body hook, inward across the end thereof, then in between the body hook and the can wall, comprising the steps of:

supporting said can to allow cutting to take place thereon, while exposing said seam for cutting;

rotating said can about its longitudinal axis relative to a cutter;

moving said rotating can, with an end bearing such seam leading relatively toward said cutter in a locus of movement designed so that said cutter contacts said cover hook, continuing said movement during cutting of said cover hook while guiding said cutter to move at a small angle to said locus away from said can, the path achieved by said guiding being arranged so that said cutter severs said cover hook, without severing said body hook and moves said severed cover hook away from said seam.

3. Seam inspection device for use with a can having a cylindrical wall and terminating at at least one end in a double seam, comprising a body hook wherein the end of the material of the can wall is curved outwardly then backwardly along the can wall, and a cover hook wherein the edge of the cover is curved to extend along the outside of the body hook, inward across the end thereof, and then in between the body hook and the can wall, means for holding said can, arranged to leave said seamed end free for cutting, said holding means including a guide surface, a cutter located to contact said guide surface when said relative movement takes place between the can and the cutter along the axis defined by the cylindrical wall of the can, said guide surface being shaped on relative approach of said cutter and said can along said axis to guide a cutter in contact therewith during relative rotation about said axis between said cutter on the one hand and said can and holding means on the other hand, along a path to cause said cutter to sever said cover hook without damage to said body hook, said cutter being oriented to so sever said cover hook when guided by said guide surface, said cutter being retractably mounted and biased to cause said cutter to retract against said bias when guided by said guide surface, means for causing relative approach between a can and said holding means on the one hand, and said cutter on the other hand along a line corresponding to said axis, means for causing relative rotation about said axis between said holding means and can on the one hand and said cutter on the other hand, during such approach.

4. Seam inspection device as claimed in claim 3 wherein said means for causing relative approach is designed and constructed so that during such relative support said can moves relative to said cutter a short distance past the point at which said cutter has severed said cover hook so that over said short distance said cutter moves said severed cover hook along said can.

* * * * *